US012605927B2

(12) United States Patent
Abello Rosello et al.

(10) Patent No.: US 12,605,927 B2
(45) Date of Patent: Apr. 21, 2026

(54) PRINTING AT LOCATIONS BASED ON GRID MAPS

(71) Applicant: Hewlett-Packard Development Company, L.P., Spring, TX (US)

(72) Inventors: Lluis Abello Rosello, Sant Cugat del Valles (ES); Ramon Viedma Ponce, Sant Cugat del Valles (ES); Borja Navas Sanchez, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 142 days.

(21) Appl. No.: 18/705,029

(22) PCT Filed: Oct. 27, 2021

(86) PCT No.: PCT/US2021/072059
§ 371 (c)(1),
(2) Date: Apr. 26, 2024

(87) PCT Pub. No.: WO2023/075816
PCT Pub. Date: May 4, 2023

(65) Prior Publication Data
US 2024/0416649 A1 Dec. 19, 2024

(51) Int. Cl.
*B41J 25/00* (2006.01)
*B41J 2/045* (2006.01)
*B41J 29/00* (2006.01)

(52) U.S. Cl.
CPC ......... *B41J 2/04526* (2013.01); *B41J 2/0458* (2013.01); *B41J 2/04581* (2013.01); *B41J 25/001* (2013.01); *B41J 29/00* (2013.01)

(58) Field of Classification Search
None
See application file for complete search history.

(56) References Cited

U.S. PATENT DOCUMENTS

| | | | |
|---|---|---|---|
| 6,729,706 | B1 | 5/2004 | Patton et al. |
| 2008/0252671 | A1 | 10/2008 | Cannell et al. |

(Continued)

FOREIGN PATENT DOCUMENTS

| | | | |
|---|---|---|---|
| CN | 109070603 | A | 12/2018 |
| CN | 109373876 | A | 2/2019 |

(Continued)

OTHER PUBLICATIONS

Wu, T., et al., "A practical system for road marking detection and recognition," Conference: Intelligent Vehicles Symposium (IV), Jun. 2012, pp. 25-30.

*Primary Examiner* — Scott A Richmond
(74) *Attorney, Agent, or Firm* — Jordan IP Law, LLC

(57) ABSTRACT

A printing apparatus is disclosed herein. The apparatus comprises a chassis moveable on a surface through a motion control system, a receiver to receive a signal from a positioning module corresponding to a distance of the printing apparatus with respect to a reference; a printhead to selectively eject an amount of a printing fluid to the surface; and a controller. The controller is to determine the actual location of the printing apparatus with respect to a grid map representative of a part of the surface, the grid map including a plurality of nodal points with its corresponding height values; and to control the motion control system to move the chassis to a first surface location corresponding to a first nodal point of the grid map. The controller is further to obtain a vertical component value with respect to the reference at the surface location; and control the printhead to eject an amount of printing fluid at the surface location in a (Continued)

pattern indicative of an error between the vertical component value and the nodal point height.

15 Claims, 4 Drawing Sheets

(56) References Cited

U.S. PATENT DOCUMENTS

| | | | | |
|---|---|---|---|---|
| 2011/0135190 | A1 * | 6/2011 | Maad | A61B 6/0407 382/154 |
| 2012/0274683 | A1 * | 11/2012 | Yamasaki | B41J 29/02 347/2 |
| 2019/0016121 | A1 * | 1/2019 | Baker | B41J 2/04508 |
| 2019/0039386 | A1 | 2/2019 | Schmidt | |

FOREIGN PATENT DOCUMENTS

| | | | |
|---|---|---|---|
| CN | 111369669 | A | 7/2020 |
| CN | 113027075 | A | 6/2021 |
| CN | 113538591 | A | 10/2021 |
| JP | 2021-011772 | A | 2/2021 |
| WO | 2012/150846 | A2 | 11/2012 |
| WO | 2019/087933 | A1 | 5/2019 |
| WO | 2022/262332 | A1 | 12/2022 |

* cited by examiner

PRINTING AT LOCATIONS BASED ON GRID MAPS

BACKGROUND

Printers are devices that record images on a printing media. Printers comprise printheads in a carriage that selectively propel an amount of printing fluid on the media. Some printers may be used to draw or print lines on a surface by depositing printing material while moving.

BRIEF DESCRIPTION OF THE DRAWINGS

The present disclosure may be more fully appreciated in connection with the following detailed description of non-limiting examples taken in conjunction with the accompanying drawings, in which like reference characters refer to like parts throughout and in which.

DETAILED DESCRIPTION

Figure 1:
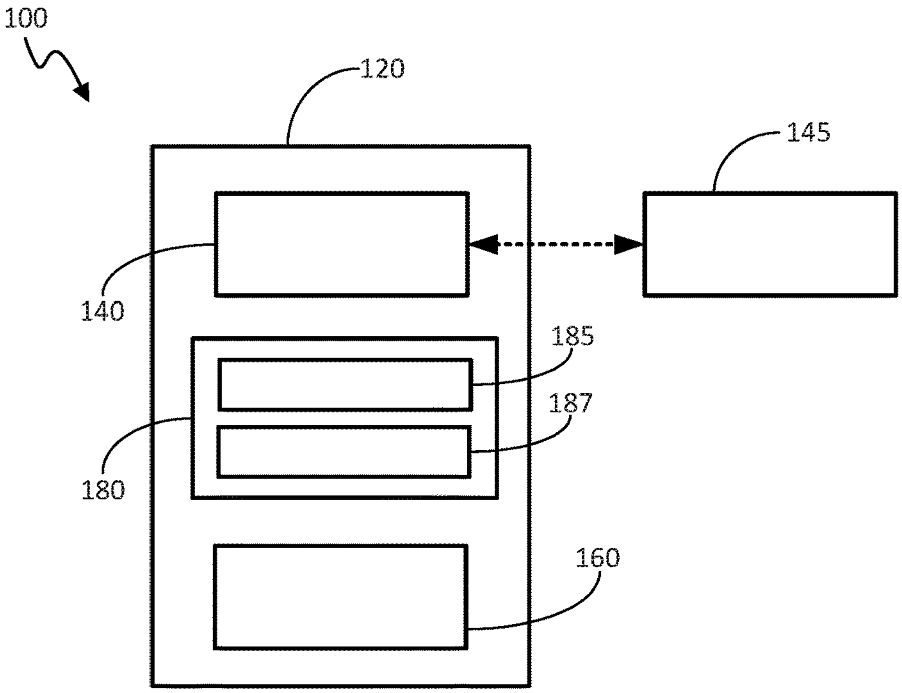
FIG. 1 is a schematic diagram showing an example of a printing apparatus.

The following description is directed to various examples of printing systems. Throughout the present disclosure, the terms "a" and "an" are intended to denote at least one of a particular element. In addition, as used herein, the term "includes" means includes but not limited to, the term "including" means including but not limited to. The term "based on" means based at least in part on.

As used herein, the terms "about" and "substantially" are used to provide flexibility to a range endpoint by providing that a given value may be, for example, an additional 15% more or an additional 15% less than the endpoints of the range. In another example, the range endpoint may be an additional 30% more or an additional 30% less than the endpoints of the range. The degree of flexibility of this term can be dictated by the particular variable and would be within the knowledge of those skilled in the art to determine based on experience and the associated description herein.

For simplicity, it is to be understood that in the present disclosure, elements with the same reference numerals in different figures may be structurally the same and may perform the same or a similar functionality.

In construction and civil engineering projects, such as building constructions, park constructions and street marking, there is often the operation of leveling or flattening an already built surface. These operations ensure that the built surface has the intended surface level or angle with respect to a horizontal plane reference as it is designed. To do so, the actual surface level is measured and compared to the intended surface level. Then, heavy machinery is often used to correct (e.g., flatten) the surface. In some examples, the actual surface level measuring is made manually. This is a manual and slow process often occasioning a bottleneck in the construction and civil engineering projects, particularly in projects involving flattening of large areas. Increasing the speed in which the actual surface level measuring is executed in an automatic manner would provide with total project time reductions.

Some printing apparatus may be implemented as marking robots. Marking robots may be, for example, autonomous vehicles which may be used for printing images such as lines on some examples, involve printing images on surfaces which may extend tens of square meters or more.

Referring now to the drawings, FIG. 1 shows an example of a printing apparatus 100. In some examples, the printing apparatus 100 may be a marking robot.

The printing apparatus 100 comprises a chassis 120 moveable on a surface. In some examples, the printing apparatus 100 may include a motion control system, to cause the apparatus 100 to travel along the surface with an intended path. For example, the motion control system may comprise a plurality of wheels connected to a motor, or to any suitable propulsion system. In some examples, the motion control system may also be connectable to a controller 180 to receive and execute instructions defining an intended path or trajectory for the apparatus 100 to follow. In some examples, the motion control system may comprise a machine readable medium or memory having stored instructions defining a predefined intended path for the apparatus 100 to follow. In other examples the motion control system, or the controller 180, may define an intended path for the apparatus 100. In some examples, the motion control system may comprise control circuitry to control wheels, a motor or other propulsion mechanism mounted on the chassis 120 of the apparatus 100 to control a direction (and in some examples, speed) of the apparatus 100. In some examples, the motion control system may comprise a microcontroller, and a servomotor in communication with a propulsion system comprising motor driver electronics to supply force to a set of wheels by the servomotor.

The apparatus 100 also includes a receiver 140 for detecting a position of the robot 500 by, for example, receiving a signal from a positioning module 145 corresponding to a distance of the printing apparatus 100 with respect to a reference. The distance and the reference may be expressed in any 30 geometrical system, such as Cartesian or polar coordinates.

In some examples, the receiver 140 includes a Global Positioning System (GPS) or a Global Navigation Satellite System (GNNS) module. In other examples, the receiver 140 may for example, comprise a sensor, or, in some examples, a plurality of sensors. The sensor(s) may be any kind of suitable position sensor such as rotary encoders located on wheels of the robot, a camera located on the body of the robot, a Light Detection and Ranging (LIDAR) system, an inertial mechanical unit to sense accelerations and direction of the apparatus 100, a combination including at least some of the previously mentioned position sensors or any other suitable kind of position sensor.

The position of the apparatus may be monitored based on a signal received from a positioning module 145. In some examples, the positioning module 145 may be an element mounted on the chassis 120. Some implementation examples in which the positioning module 145 is part of the apparatus 100 may include a GPS, a barometric altimeter or an Inertial Measurement Unit (IMU). In other examples, the positioning module 145 may be an external element from the apparatus 100 which may interact with the receiver 140. In examples, the positioning module 145 includes a camera, located externally to the robot and the receiver 140 may comprise a processor to receive position information forth apparatus 100. In some examples, an external positioning module 145 may be a robotic total station which may be connectable to the receiver through infrared (IR) signals and/or Bluetooth connectivity. In some examples, the total station sends infrared signals to the receiver 140 to measure its location according to some of the method described herein. Then, a wireless connection, such as a Bluetooth connection, might be stablished between the robotic total station 145 and the receiver 140 to obtain the location value.

In some examples, the positioning module 145 or a computer system (e.g., a controller 180 of the apparatus 100) may determine a magnitude and direction of the difference between the apparatus's 100 current position and its intended path and may correct the path of the apparatus 100 accordingly. In some examples, the computer system operating the apparatus 100 may be external to the apparatus 100, the computer system comprising in some examples a sensor such as a camera of the positioning module 14. In some examples, the position detection apparatus 145 may comprise a total station theodolite (TST) located on the apparatus 100.

In some examples, information from the positioning module 145 may be compared with a predefined path to detect deviations. For example, accelerations in an axis other than that defined by the servo path can indicate that the apparatus 100 is not following the defined servo path. In some examples, a determination that rotary encoders on the apparatus' wheels are not increasing steadily can provide an indication that the apparatus 100 has deviated from the defined path. The receiver 140 may comprise processing circuitry (e.g., controller 180) to determine whether a determined position matches an intended path of the apparatus 100.

In some examples, the apparatus 100 comprises a printing fluid tank including a set of printheads 160 in fluid communication with a set of printing fluids within the tank. In other examples, the apparatus 100 comprises a carriage (not shown) including a set of printheads 160 in fluid communication with a set of printing fluids from a supply or cartridge. Some examples of printheads 160 may include thermal inkjet printheads, piezoelectrical printheads, or any other suitable type of printhead 160. In some examples, the printheads 160 are removable printheads. In other examples, the printheads 160 are an integral part of the carriage. The supply is an external and removable element from the apparatus 100. In some examples, the supply is to be hosted in the carriage, for example in a designated slot within the carriage.

When in use, the carriage is further controllable such that the printheads 160 selectively eject amount of a set of printing fluids on the surface (e.g., ground surface) based on data generated by the controller 180. The print job data may be a digital product including images and/or text to be recorded on the surface. The print job data may be received in a plurality of digital formats, such as CAD, JPEG, TIFF, PNG, PDF and the like.

In some examples, the printheads may eject a plurality of printing fluids. A printing fluid may be a solution of pigments dispersed in a liquid carrier such as water or oil. Some recording printing fluids may include Black ink, White ink, Cyan ink, Yellow ink, Magenta ink, Red ink, Green ink, and/or Blue ink. Other non-recording printing fluids may be used to provide additional properties to the printing fluids ejected on the surface, for example, resistance to light, heat, scratches, and the like.

The apparatus 100 comprises a controller 180. The controller 180 comprises a processor 185 and a memory 187 with specific control instructions to be executed by the processor 185. The functionality of the controller 180 is described further below with reference to FIG. 2.

In the examples herein, the controller 180 may be any combination of hardware and programming that may be implemented in a number of different ways. For example, the non-transitory machine-readable storage medium and the hardware for modules may include at least one processor to execute those instructions. In some examples described herein, multiple modules may be collectively implemented by a combination of hardware and programming. In other examples, the functionalities of the controller 180 may be, at least partially, implemented in the form of an electronic circuitry. The controller 180 may be a distributed controller, a plurality of controllers, and the like. In the examples herein, the chassis 120, receiver 140 and the printhead 160 may be coupled to the controller 180 to execute the functionalities described herein.

Figure 2:
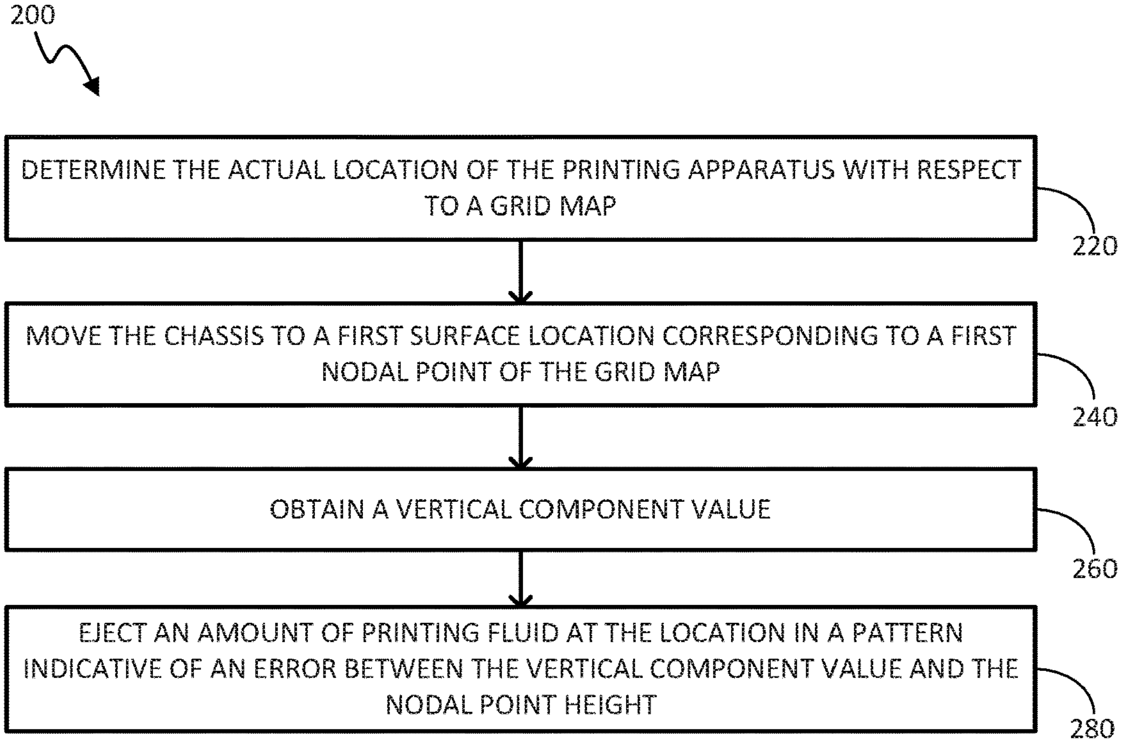
FIG. 2 is a flowchart of an example method for ejecting a printing fluid on a surface.

FIG. 2 is a flowchart of an example method 200 for ejecting a printing fluid on a surface. In some examples, method 200 may be executed by the controller 180 of the printing apparatus 100. The method 200 may involve previously disclosed elements from FIG. 1 referred to with the same reference numerals.

In some examples, the method 200 may start once connectivity between the receiver 140 and the positioning module 145 has been established. As mentioned above, in some examples, the positioning module 145 may be connectable to the receiver through infrared signals and/or Bluetooth connectivity. For example, the positioning module 145 sends infrared signals to the receiver 140 to measure its location and then establishes a wireless connection, such as the Bluetooth or WIFI connection, with the receiver 140 to send the actual location value of the apparatus 100 with respect to a reference point.

In the examples herein, the controller 180 may have received data corresponding to a grid map representative of a part of the target surface. The grid map includes a plurality of nodal points or nodes spaced apart by a predetermined distance. In examples, the nodal point distribution across the grid map may be a regular, irregular or stochastic node distribution. Each nodal point includes data indicative of the target or expected height of each corresponding location from the portion of the surface. Examples of grid maps are illustrated with reference to FIGS. 3A and 3B.

Additionally, or alternatively, in some examples, the controller 180 is instead to receive a location map of the part of the surface (e.g., CAD file) including data corresponding to the intended height of the different locations throughout the map. The controller 180 may then compute and generate the grid map of the part of the surface including the nodal points height values, based on the received location map. In other examples, however, the grid map is directly sent to the controller 180 and may be stored in the memory 187 therein.

At block 220, the controller 180 determines the actual location of the printing apparatus 100 with respect to the grid map, where the grid map is representative of the part of the surface. The actual location data is sent to the controller 180 by the receiver 140 which, in turn, may have received the actual location of the apparatus 100 by the positioning module 145.

At block 240, the controller 180 moves the printing apparatus 100 to a first location corresponding to a first nodal point of the grid map. In examples, the controller 180 is to move the chassis 120 by controlling the motion control system. In some examples, the controller 180 may define the first location as the location of the nodal point which is in the substantially closest position with respect to the actual location of the printing apparatus 100. In other examples, the first location may be defined as the location of a nodal point which is at a corner or an edge within the grid map. In yet additional examples, the controller 180 may receive additional data including the location of the first nodal point.

At block 260, the controller 180 is to obtain the actual vertical component value with respect to the reference point at the first surface location (i.e., location of the first nodal point). The positioning module 145 may send data corresponding to the actual location value at the first surface location of the printing apparatus 100 to the receiver 140. In examples, the data is the distance between the printing apparatus 100 and the reference. In the example in which the data is in Cartesian coordinates (e.g., x-depth, y-length, z-height), the vertical component value corresponds to data including the z-height value. In some examples, the actual vertical component may involve operating the received z-height value (e.g., when the reference of the positioning module is different than the reference of the grid map height values). In other examples, however, the actual vertical component is the received z-height value.

At block 280, the controller 180 controls the printhead 160 to eject an amount of printing fluid at the surface location in a pattern. The pattern is indicative of an error between the vertical component value and the nodal height point. The controller 180 may determine the error as the difference between the vertical component value and the nodal point height. In some examples, the pattern is a printable version of the error (e.g., +2 mm, −1 mm). In other examples the pattern corresponds to a printable code (e.g., color code) representative of the error.

In additional examples, the controller 180 is further to determine a second nodal point of the grid map. In some examples, the second nodal point is a neighboring nodal point with respect to the first nodal point, for example, the subsequent nodal point or the closest nodal point. In other examples, the second nodal point is selected based on a predefined trajectory pattern of the printing apparatus 100 encoded, for example, in the memory 187 of the controller 180. The controller 180 is then to move the chassis 120 to the surface location corresponding to the second nodal point. Blocks 260-280 may be executed thereafter. As such, the controller 180 may execute blocks 220-280 iteratively to print the pattern indicative of the error at the nodal points of the grid map (e.g., each nodal point of the grid map).

The apparatus 100 provides with a leaner and faster way of marking (e.g., printing) a surface of a construction and civil engineering projects with a pattern indicative of the height error between the actual and intended (i.e., designed) height values, thereby substantially reducing the cost and time of such operation.

Figure 3A:
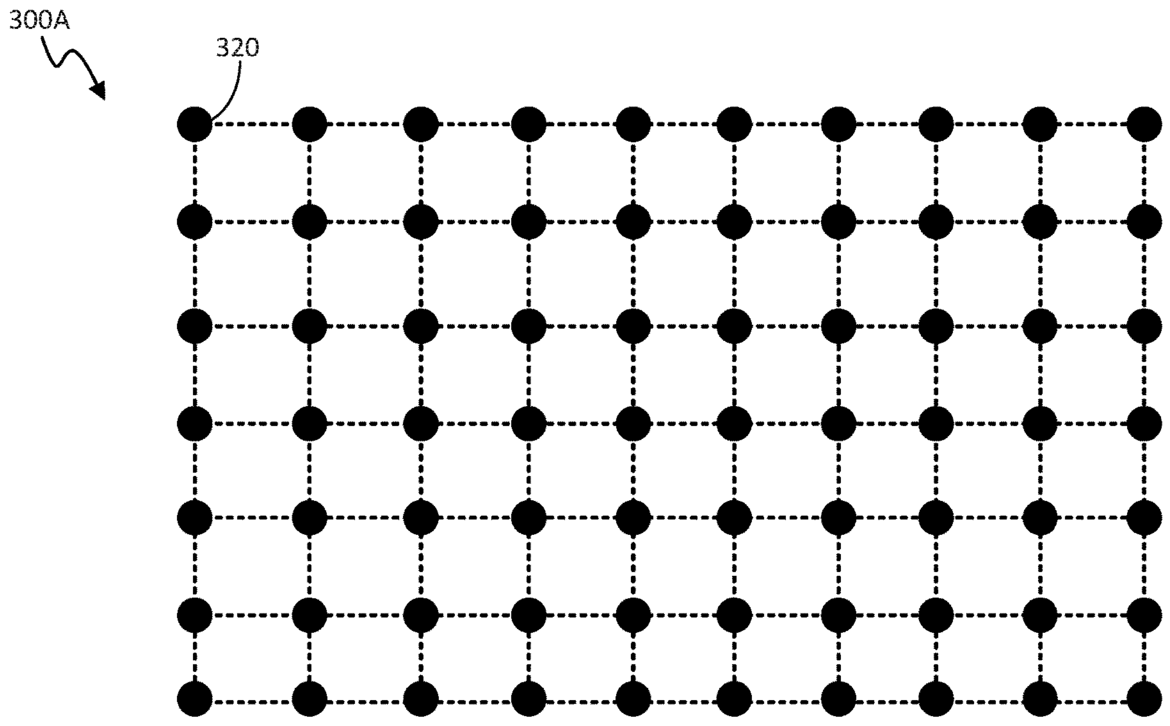
FIG. 3A is a schematic diagram showing an example of a grid map.

FIG. 3A is a schematic diagram showing an example of a grid map 300A. The grid map 300A may be used, for example, as the grid map described with reference to blocks 220, 240 and 280 of FIG. 2.

The grid map 300A discretize a surface or part of a surface as a render grid including a set of lines (e.g., vertical and horizontal lines). Even though the grid map 300A is illustrated as a regular grid, it is to be understood that the grid map 300A may include an irregular or stochastic pattern. The intersections between the different lines of the grid map 300A (e.g., intersection between the vertical and horizontal lines of the grid map 300A) define the plurality of nodal points 320 or nodes 320. In some examples the distance between two consecutive nodal points (i.e., internodal distance) ranges from about 5 cm to about 4 m. In other examples, the internodal distance ranges from about 50 cm to about 3 m. In yet other examples, the internodal distance is less than about 50 cm. It is to be noted that the resolution provided by the grid map, and thus the error patterns recorded on the surface, is a much finer resolution than traditional methods (e.g., over 5 m, 10 m or 15 m).

As mentioned above, each nodal point 320 of the grid map 300A includes data associated with the intended height value at the surface location corresponding to the nodal point 320. For example, two different nodal points located at different heights from a sloped surface may have different height values.

Figure 3B:
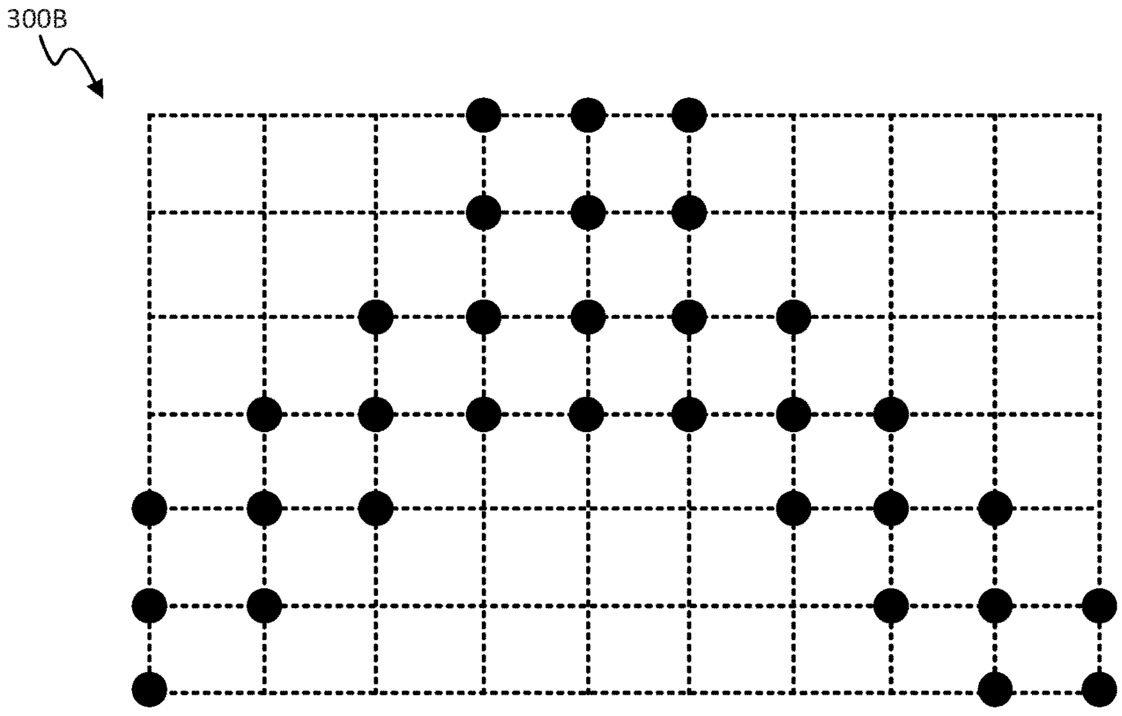
FIG. 3B is a schematic diagram showing an example of a modified grid map.

FIG. 3B is a schematic diagram showing an example of a modified grid map 300B. The modified grid map 300B may be a modification of grid map 300A of FIG. 3A. The modified grid map 300A may be used, for example, as the grid map described with reference to blocks 220, 240 and 280 of FIG. 2.

In some examples, the controller 180 received an input corresponding to a subset (e.g., a portion) of the part of the surface. For example, the subset may correspond to a walkway of a park in which the flattening operation may be executed to the portions of the park corresponding to the walkway, thereby leaving the green areas of the park unflatten. As such, in some examples, the printing apparatus 100 may not be to record the error values corresponding to the subset of the part of the surface. In other examples, however, the printing apparatus 100 may not be to record the error values corresponding to the portions of the surface other than the subset of the part of the surface.

Following with the examples, the controller 180 modifies the grid map (e.g., grid map 300A) to exclude the nodal points other than the nodal points corresponding to the subset of the part of the surface (e.g., exclude the nodal points corresponding to the green areas of the park, thereby leaving the nodal points corresponding to the walkway).

Figure 4:
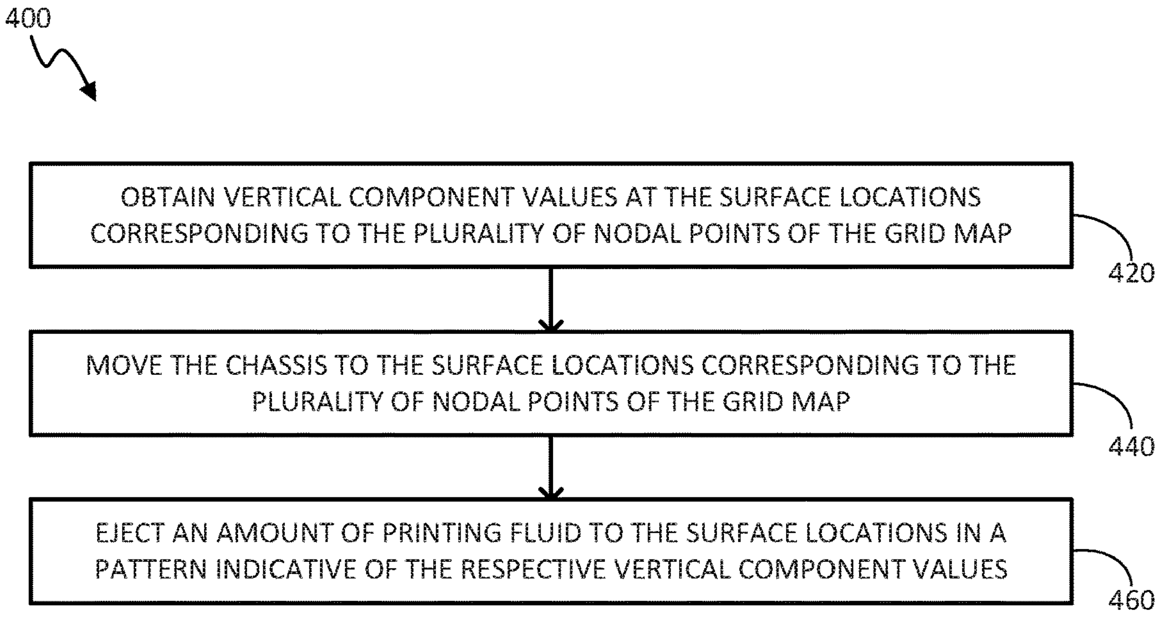
FIG. 4 is a flowchart of another example method for ejecting a printing fluid on a surface.

FIG. 4 is a flowchart of another example method 400 for ejecting a printing fluid on the surface. Method 400 may involve previously disclosed elements from FIGS. 1, 2 and 3A-3B referred to with the same reference numerals. In some examples, parts of the method 400 may be executed by a controller, such as controller 180 from FIG. 1. Method 400 may be implemented after the execution of block 280 from FIG. 2.

At block 420, the controller 180 is to obtain, through the receiver 140, the vertical component values at the surface locations corresponding to the plurality of nodal points of the grid map (e.g., grid map 300A or 300B). The execution of block 420 may be similar to as of block 260 applied to the plurality of nodal points of the grid map.

At block 440, the controller 180 is to move the chassis to the surface locations corresponding to the plurality of nodal points of the grid map. The execution of block 440 may be similar to as of block 240 applied to the plurality of nodal points of the grid map.

At block 460, the controller is to control the printhead to eject an amount of printing fluid to the surface locations in a pattern indicative of the respective vertical component values. The execution of block 460 may be similar to as of block 280 applied to the plurality of nodal points of the grid map.

Figure 5:
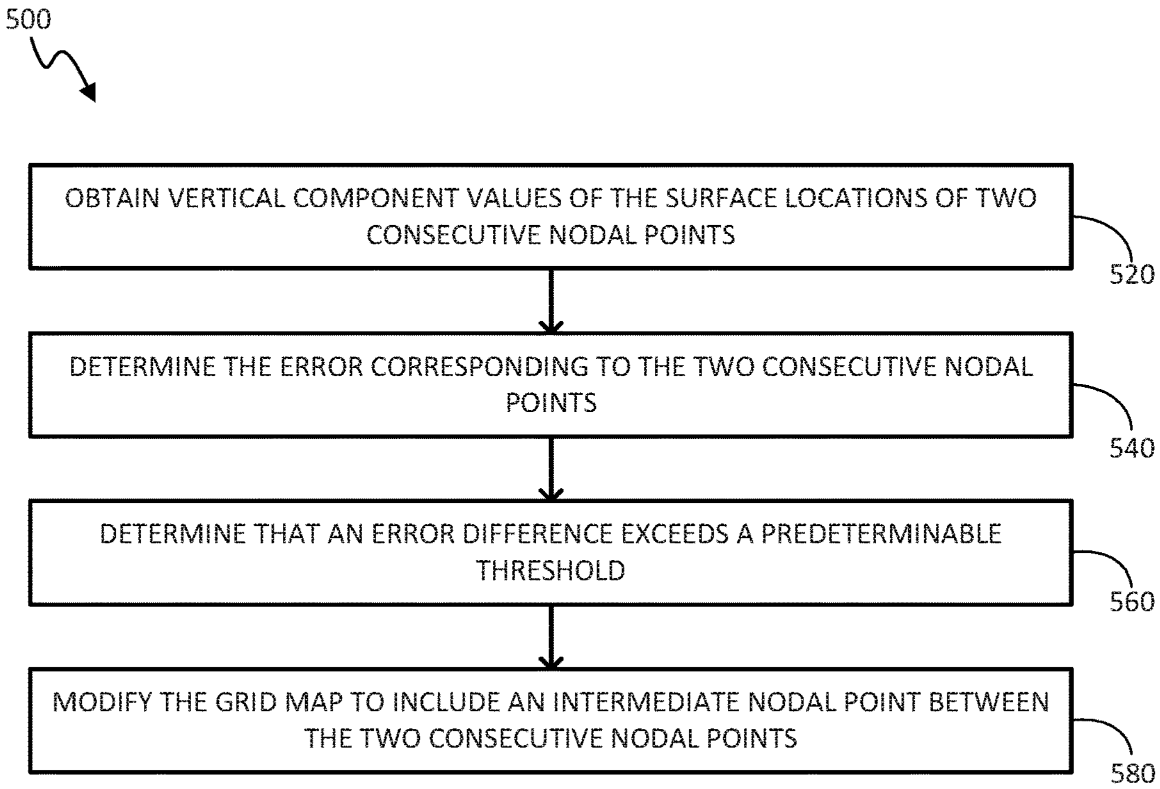
FIG. 5 is a flowchart of an example method to modify the grid map.

FIG. 5 is a flowchart of an example method 500 to modify the grid map. Method 500 may involve previously disclosed elements from FIGS. 1, 2 and 3A-3B referred to with the same reference numerals. In some examples, parts of the method 500 may be executed by a controller, such as controller 180 from FIG. 1. Method 500 may be implemented after the execution of blocks 260 or 280 from FIG. 2.

In some instances, there might be abrupt height gradients between the vertical component values corresponding to locations of two consecutive nodal points. In these instances, having an internodal value would provide with a finer resolution and the flattening operation might be executed in a more precise way.

At block 520, the controller 180 obtains vertical component values of the surface locations of two consecutive nodal points. The execution of block 520 may be similar to as of block 260 applied to the two consecutive nodal points.

At block 540, the controller 180 determines the error corresponding to the two consecutive nodal points. The execution of block 540 may be similar to as of block 560 applied to the two consecutive nodal points.

At block 560, the controller 180 determines an error difference of the determined errors of the two consecutive nodal points. In some examples the error difference may be an absolute error difference. In other examples, however, the error difference may be a percentage error difference. Then, the controller 180 determines whether the error difference exceeds a predeterminable threshold. In some examples, the predeterminable threshold may be a threshold value selected from the range defined by about 0 to about 5 cm, for example about 1, 3, 5, 7, 10, 12, 15, 17, 20, 25, 30, 35, 40, 45 or 50 mm. In other examples, the predeterminable threshold may be a threshold value greater than 50 mm.

At block 580, if the controller 180 has determined that the error difference exceeds the predeterminable threshold (i.e., block 560), the controller 180 modifies the grid map (e.g., grid map 300A or grid map 300B) to include an intermediate nodal point between the two consecutive nodal points. Then the controller 180 is to execute blocks 240-280 of FIG. 2 with respect to the intermediate nodal point. This way, the printing apparatus 100 records an additional intermediate error pattern at an intermediate location between two locations with an abrupt height gradient, thereby providing with a finer resolution. As mentioned above, providing with a finer resolution enables the flattening operation to be executed in a more precise way.

In some examples, method 500 may be computed as a pre-processing routine. In other examples, method 500 may be computed during the printing execution, thereby executing the method of FIG. 4, and then printing back pattern errors corresponding to the computed additional intermediate nodal points.

Figure 6:
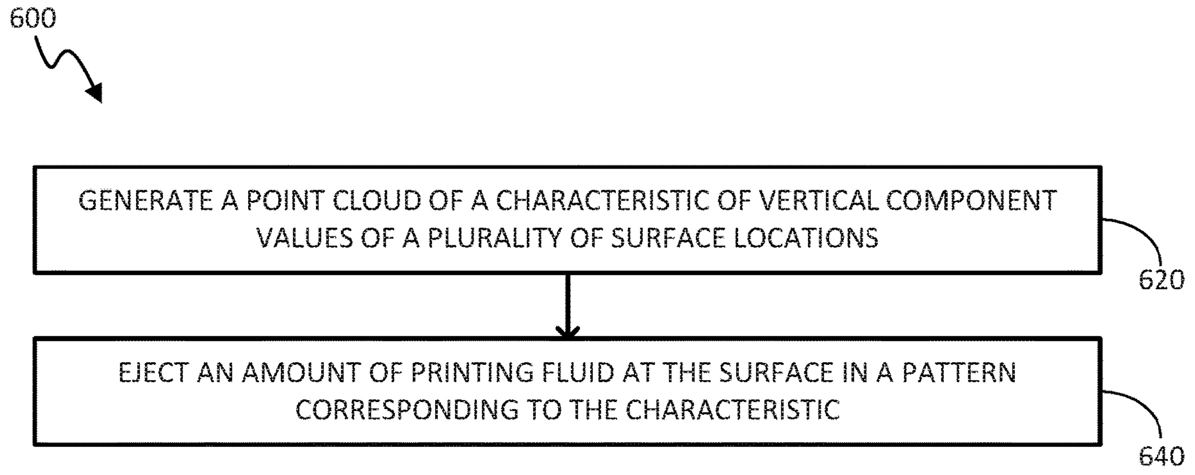
FIG. 6 is a flowchart of another example method for ejecting a printing fluid on a surface.

FIG. 6 is a flowchart of another example method 600 for ejecting a printing fluid on a surface. Method 600 may involve previously disclosed elements from FIGS. 1, 2 and 3A-3B referred to with the same reference numerals. In some examples, parts of the method 600 may be executed by a controller, such as controller 180 from FIG. 1. Method 600 may be implemented after the execution of block 280 from FIG. 2.

In some instances, construction and civil engineering projects comprise recording isolines of a characteristic of the surface. Some examples of these characteristics may include lines representing locations at a given height or gradient lines (e.g., angle, delta error, etc.).

To that end, at block 620, the controller 180 is to generate a point cloud on the characteristic of vertical component values of a plurality of surface locations corresponding to a plurality of nodal points (e.g., nodal points of the grid map). In some examples, the generated point cloud is stored and exported in a file formal (e.g., CSV, Excel) to be used for further processes. In other examples, the point cloud may be generated through an external device, such as a 3D scanner, and the point cloud file is then sent to the controller 180.

At block 640, the controller 180 controls the motion control system and the printhead 160 to respectively move and eject an amount of the printing fluid at the surface in a pattern corresponding to the characteristic. In an example, the printing apparatus 100 is to record a set of lines (e.g., of different colors) representing the portions of the surface which are at different height values.

Figure 7:
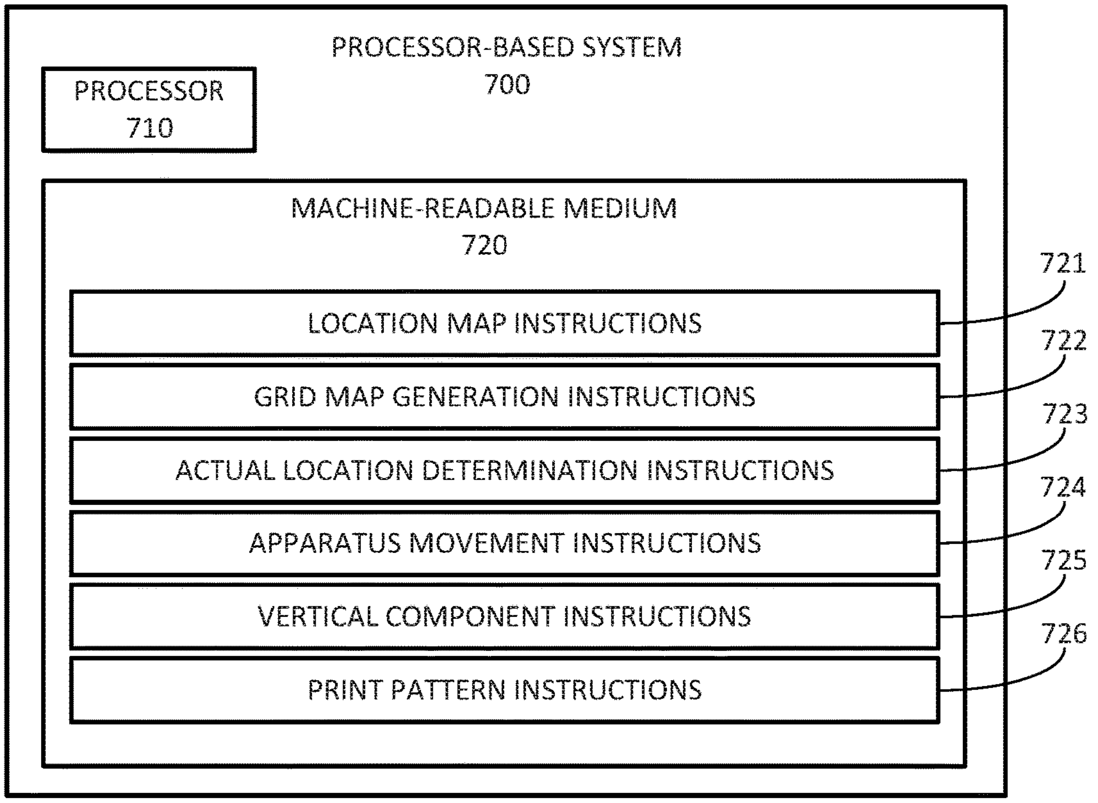
FIG. 7 is a block diagram showing a processor-based system example to print a pattern on a surface.

FIG. 7 is a block diagram showing a processor-based system 700 example to print a pattern on a surface. In the examples herein, the instructions of system 700 may involve previously disclosed elements from FIGS. 1, 2 and 3A-3B referred to with the same reference numerals.

In some implementations, the system 700 is a processor-based system and may include a processor 710 coupled to a machine-readable medium 720. The processor 710 may include a single-core processor, a multi-core processor, an application-specific integrated circuit (ASIC), a field programmable gate array (FPGA), and/or any other hardware device suitable for retrieval and/or execution of instructions from the machine-readable medium 720 (e.g., instructions 721-726) to perform functions related to various examples. Additionally, or alternatively, the processor 710 may include electronic circuitry for performing the functionality described herein, including the functionality of instructions 721-726. With respect of the executable instructions represented as boxes in FIG. 7, it should be understood that part or all of the executable instructions and/or electronic circuits included within one box may, in alternative implementations, be included in a different box shown in the figures or in a different box not shown.

The machine-readable medium 720 may be any medium suitable for storing executable instructions, such as a random-access memory (RAM), electrically erasable programmable read-only memory (EEPROM), flash memory, hard disk drives, optical disks, and the like. In some example implementations, the machine-readable medium 720 may be a tangible, non-transitory medium, where the term "non-transitory" does not encompass transitory propagating signals. The machine-readable medium 720 may be disposed within the processor-based system 700, as shown in FIG. 7, in which case the executable instructions may be deemed "installed" on the system 700. Alternatively, the machine-readable medium 720 may be a portable (e.g., external) storage medium, for example, that the storage medium. In this case, the executable instructions may be part of an "installation package". As described further herein below, the machine-readable medium may be encoded with a set of executable instructions 721-726.

Instructions 721, when executed by the processor 710, may cause the processor 710 to receive a location map corresponding to a part of a surface.

Instructions 722, when executed by the processor 710, may cause the processor 710 to generate, based on the location map, a grid map (e.g., grid map 300A) of the part of the surface including a plurality of nodal points (e.g., nodal point 320) with its corresponding height values.

Instructions 723, when executed by the processor 710, may cause the processor 710 to determine the actual location of a printing apparatus (e.g., printing apparatus 100) with respect to the grid map.

Instructions 724, when executed by the processor 710, may cause the processor 710 to move the apparatus to a location corresponding to a nodal point of the grid map.

Instructions 725, when executed by the processor 710, may cause the processor 710 to obtain a vertical component value with respect to a reference at the location.

Instructions 726, when executed by the processor 710, may cause the processor 710 to print a pattern indicative of an error between the vertical component value at the location and the nodal point height.

The above examples may be implemented by hardware, or software in combination with hardware. For example, the various methods, processes and functional modules described herein may be implemented by a physical processor (the term processor is to be implemented broadly to include CPU, SoC, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processor, or a combination thereof.

The drawings in the examples of the present disclosure are some examples. It should be noted that some units and functions of the procedure may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

What it is claimed is:

1. A printing apparatus comprising:
- a chassis moveable on a surface through a motion control system;
- a receiver to receive a signal from a positioning module corresponding to a distance of the printing apparatus with respect to a reference;
- a printhead to selectively eject an amount of a printing fluid to the surface;
- a controller to:
  - determine, through the receiver, the actual location of the printing apparatus with respect to a grid map representative of a part of the surface, the grid map including a plurality of nodal points with its corresponding height values;
  - control the motion control system to move the chassis to a first surface location corresponding to a first nodal point of the grid map;
  - obtain, through the receiver, a vertical component value with respect to the reference at the surface location; and
  - control the printhead to eject an amount of printing fluid at the surface location in a pattern indicative of an error between the vertical component value and the nodal point height.

2. The printing apparatus of claim 1, wherein the controller is further to:
- receive a location map of the part of the surface; and
- compute the grid map of the part of the surface based on the location map.

3. The printing apparatus of claim 1, wherein the controller is further to:
- determine a second nodal point of the grid map, wherein the second nodal point is a neighboring nodal point with respect to the first nodal point; and
- control the motion control system to move the chassis to a second surface location corresponding to the second nodal point.

4. The printing apparatus of claim 1, wherein the controller is further to:
- obtain, through the receiver, vertical component values at the surface locations corresponding to the plurality of nodal points of the grid map;
- control the motion control system to move the chassis to the surface locations corresponding to the plurality of nodal points of the grid map;
- control the printhead to eject an amount of printing fluid to the surface locations in a pattern indicative of the respective vertical component values.

5. The printing apparatus of claim 1, wherein the distance between two consecutive nodal points is less than 50 cm.

6. The printing apparatus of claim 1, wherein the controller is further to:
- receive an input corresponding to a subset of the part of the surface; and
- modify the grid map to exclude the nodal points other than the nodal points corresponding to the subset of the part of the surface.

7. The printing apparatus of claim 1, wherein the controller is further to:
- obtain vertical component values of the surface locations of two consecutive nodal points;
- determine the error corresponding to the two consecutive nodal points;
- determine that an error difference exceeds a predeterminable threshold; and
- modify the grid map to include an intermediate nodal point between the two consecutive nodal points.

8. The printing apparatus of claim 1, wherein the receiver is a Global Positioning System (GPS) or Global Navigation Satellite System (GNNS) receiver.

9. The printing apparatus of claim 1, wherein the positioning module is an external total robotic station connectable to the receiver through infrared (IR) signals and/or Bluetooth connectivity.

10. The printing apparatus of claim 1, wherein the controller is further to:
- obtain a point cloud of a characteristic of vertical component values of a plurality of surface locations corresponding to a plurality of nodal points; and
- control the printhead to eject an amount of printing fluid at the surface in a pattern corresponding to the characteristic.

11. The method of claim 10, further comprising:
- receiving a location map of the part of the surface; and
- computing the grid map of the part of the surface based on the location map.

12. The method of claim 10, further comprising:
- receiving an input corresponding to a subset of the part of the surface; and
- modifying the grid map to exclude the nodes other than the nodes corresponding to the subset of the part of the surface.

13. A method comprising:

determining the actual location of a moveable printing apparatus with respect to a grid map of a part of the surface, the grid map including a plurality of nodes with its corresponding height values;

moving the apparatus to a location corresponding to a node of the grid map;

determining, by a positioning module, a vertical component value with respect to a reference at the location; and printing a pattern corresponding to an error between the vertical component value at the location and the node height.

14. The method of claim 13, further comprising:

selecting an additional node of the grid map, wherein the additional node is a neighboring node with respect to the node; and moving the chassis to a location corresponding to the additional node.

15. A non-transitory machine-readable medium storing instructions executable by a instructions to receive a location map corresponding to a part of a surface;

instructions to generate, based on the location map, a grid map of the part of the surface including a plurality of nodal points with its corresponding height values;

instructions to determine the actual location of a printing apparatus with respect to the grid map;

instructions to move the apparatus to a location corresponding to a nodal point of the grid map;

instructions to obtain a vertical component value with respect to a reference at the location; and instructions to print a pattern indicative of an error between the vertical component value at the location and the nodal point height.

* * * * *